(12) United States Patent
Naidu et al.

(10) Patent No.: US 7,543,687 B2
(45) Date of Patent: Jun. 9, 2009

(54) PISTON DAMPER ASSEMBLY, AND DUST TUBE SUBASSEMBLY, HAVING A POSITION SENSOR

(75) Inventors: Malakondaiah Naidu, Troy, MI (US); Thomas W. Nehl, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 372 days.

(21) Appl. No.: 11/376,836

(22) Filed: Mar. 16, 2006

(65) Prior Publication Data

US 2007/0215420 A1 Sep. 20, 2007

(51) Int. Cl.
*F16D 66/02* (2006.01)
(52) U.S. Cl. ............... 188/1.11 E; 188/267; 188/322.12
(58) Field of Classification Search .... 188/1.11 R–1.11 E, 266–322.5
See application file for complete search history.

(56) References Cited

U.S. PATENT DOCUMENTS

| | | | |
|---|---|---|---|
| 4,502,006 | A | 2/1985 | Goodwin et al. |
| 4,949,573 | A | 8/1990 | Wolfe et al. |
| 5,251,729 | A | 10/1993 | Nehl et al. |
| 5,961,899 | A | 10/1999 | Rossetti et al. |
| 6,070,681 | A | 6/2000 | Catanzarite et al. |
| 6,336,535 | B1 | 1/2002 | Lisenker |
| 6,378,671 | B1 | 4/2002 | Carlson |
| 6,390,253 | B1 | 5/2002 | Oliver |
| 6,427,813 | B1 | 8/2002 | Carlson |
| 6,471,018 | B1 | 10/2002 | Gordaninejad et al. |
| 6,497,309 | B1 | 12/2002 | Lisenker |
| 6,637,557 | B2 | 10/2003 | Oliver et al. |
| 6,640,940 | B2 | 11/2003 | Carlson |
| 6,695,102 | B1 | 2/2004 | Marjoram et al. |
| 6,866,127 | B2 | 3/2005 | Nehl et al. |
| 6,953,108 | B2 | 10/2005 | Anderfaas et al. |
| 6,974,000 | B2 | 12/2005 | Carlson et al. |
| 7,308,975 | B2 * | 12/2007 | Nehl et al. ................. 188/267 |

(Continued)

FOREIGN PATENT DOCUMENTS

FR 2608752 12/1987

(Continued)

OTHER PUBLICATIONS

European Search Report date Jun. 27, 2007.

*Primary Examiner*—Xuan Lan Nguyen
(74) *Attorney, Agent, or Firm*—Thoms N. Twomey

(57) ABSTRACT

A piston damper assembly includes a piston damper and a relative position sensor. The piston damper includes a damper body and a piston rod. The piston rod is axially movable within the damper body. The relative position sensor includes an axially-extending magnetic core, an excitation coil, and a position-sensing coil. The axially-extending magnetic core is movable with the piston rod, is located outside the damper body, and has first and second protrusions extending toward the damper body. The excitation coil is wound around the first protrusion, and the position-sensing coil is wound around the second protrusion. A piston-damper dust tube subassembly includes an axially-extending piston-damper dust tube and a relative position sensor. The relative position sensor includes an axially-extending magnetic core, an excitation coil, and a position-sensing coil. The axially-extending magnetic core is attached to the dust tube and has first and second protrusions.

15 Claims, 3 Drawing Sheets

U.S. PATENT DOCUMENTS

| | | |
|---|---|---|
| 2002/0100649 A1 | 8/2002 | Agrotis et al. |
| 2003/0075401 A1 | 4/2003 | Carlson |
| 2004/0084259 A1 | 5/2004 | Carlson |
| 2004/0089506 A1 | 5/2004 | Nehl et al. |
| 2004/0154887 A1 | 8/2004 | Nehl et al. |
| 2005/0120795 A1 | 6/2005 | Nehl et al. |
| 2005/0253350 A1 | 11/2005 | Suchta et al. |

FOREIGN PATENT DOCUMENTS

| | | |
|---|---|---|
| WO | WO2004/018893 A2 | 8/2003 |

* cited by examiner

US 7,543,687 B2

PISTON DAMPER ASSEMBLY, AND DUST TUBE SUBASSEMBLY, HAVING A POSITION SENSOR

TECHNICAL FIELD

The present invention relates generally to piston dampers, and more particularly to a piston damper assembly, and to a dust tube subassembly thereof, having a relative position sensor.

BACKGROUND OF THE INVENTION

Conventional piston damper assemblies include a magnetic friction piston damper assembly having a piston damper and a relative position sensor. The relative position sensor is a linear potentiometer whose electrical resistance varies in proportion to the piston displacement in the housing thereby indicating the relative position of the housing and the piston. Conventional piston damper assemblies also include a vehicle suspension strut whose height is sensed by the magnitude of the phase difference between AC current and voltage in a coil. Such conventional piston damper assemblies having such relative position sensors are not well adapted to also integrate a separate relative velocity sensor into a compact design for the piston damper assembly.

What is needed is an improved piston damper assembly, and an improved dust tube subassembly thereof, having a position sensor.

SUMMARY OF THE INVENTION

In a first expression of an embodiment of the invention, a piston damper assembly includes a piston damper and a relative position sensor. The piston damper includes a damper body and a piston rod. The piston rod is axially movable within the damper body. The relative position sensor includes an axially-extending magnetic core, an excitation coil, and a position-sensing coil. The axially-extending magnetic core is movable with the piston rod, is located outside the damper body, and has first and second protrusions extending toward the damper body. The excitation coil is wound around the first protrusion, and the position-sensing coil is wound around the second protrusion.

In a second expression of an embodiment of the invention, A piston damper assembly includes a piston damper and a relative position sensor. The piston damper includes a damper body, a piston rod, and a dust tube. The piston rod is axially movable within the damper body. The dust tube circumferentially surrounds at least an axial portion of the damper body and is attached to the piston rod. The relative position sensor includes an axially-extending magnetic core, an excitation coil, and a position-sensing coil. The axially-extending magnetic core is attached to the dust tube and has first and second protrusions extending toward the damper body. The excitation coil is wound around the first protrusion, and the position-sensing coil is wound around the second protrusion.

In a third expression of an embodiment of the invention, a piston-damper dust tube subassembly includes an axially-extending piston-damper dust tube and a relative position sensor. The relative position sensor includes an axially-extending magnetic core, an excitation coil, and a position-sensing coil. The axially-extending magnetic core is attached to the dust tube and has first and second protrusions. The excitation coil is wound around the first protrusion. The position-sensing coil is wound around the second protrusion.

Several benefits and advantages are derived from one or more of the expressions of an embodiment of the invention. In one example, having a relative position sensor including an axially-extending magnetic core attached to the dust tube, an excitation coil wound around a first protrusion of the magnetic core, and a position-sensing coil wound around a second protrusion of the magnetic core, also allows a relative velocity sensor to be compactly integrated therein. In this example, the relative velocity sensor includes an axially-extending permanent magnet attached to the magnetic core and positioned between, and spaced apart from, the first and second protrusions. In this example, the relative velocity sensor also includes a velocity-sensing coil wound around the permanent magnet.

DETAILED DESCRIPTION

Figure 1:
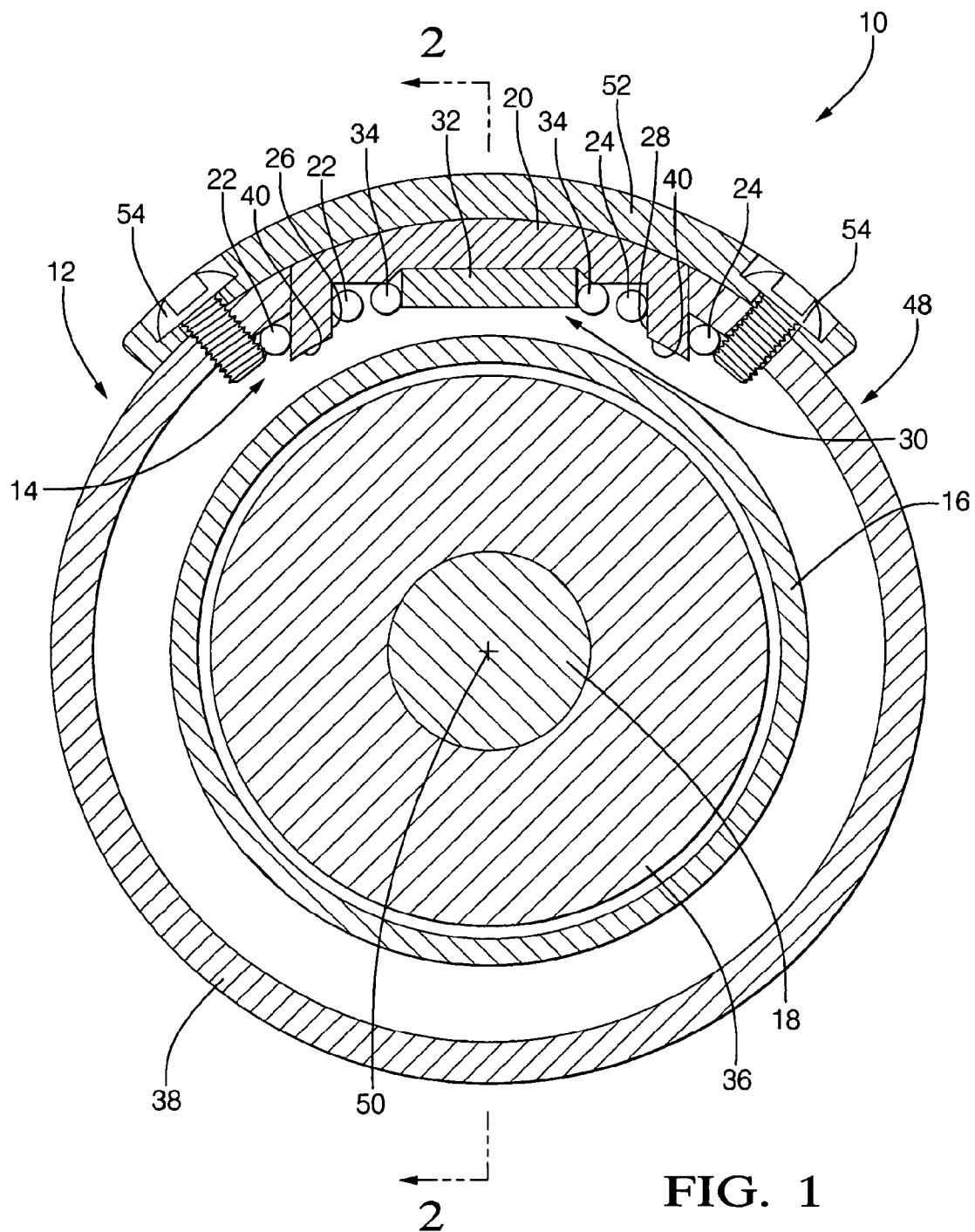
FIG. 1 is cross-sectional view of an embodiment of the invention including a piston damper assembly and a dust tube subassembly thereof including a relative position sensor and a relative velocity sensor.
Figure 2:
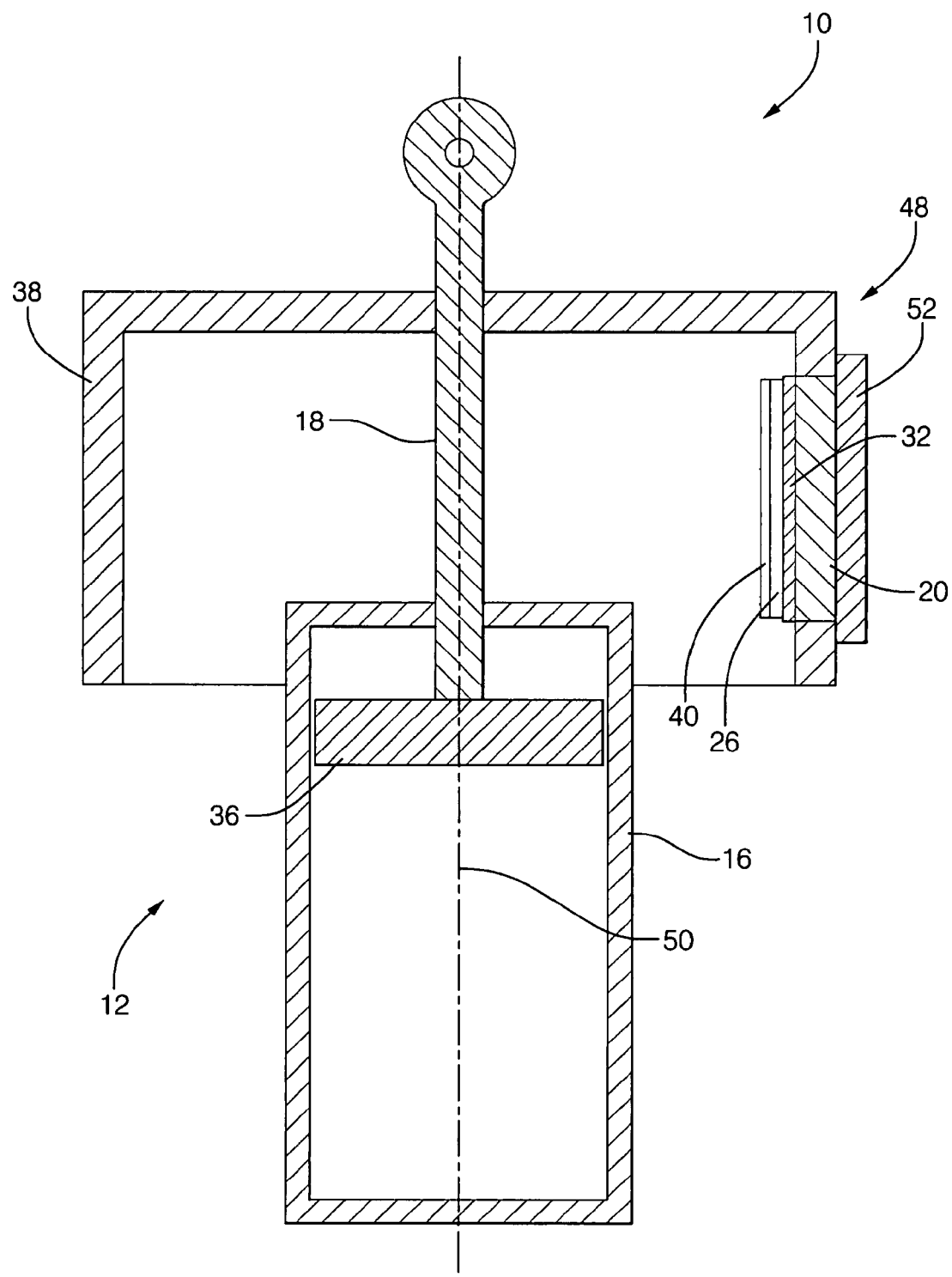
FIG. 2 is view of the piston damper assembly of FIG. 1, taken along lines 2-2 in FIG. 1, wherein the piston rod is shown at maximum axial extension with respect to the damper body, and with the excitation coil, the position-sensing coil, and the velocity-sensing coil omitted for clarity.
Figure 3:
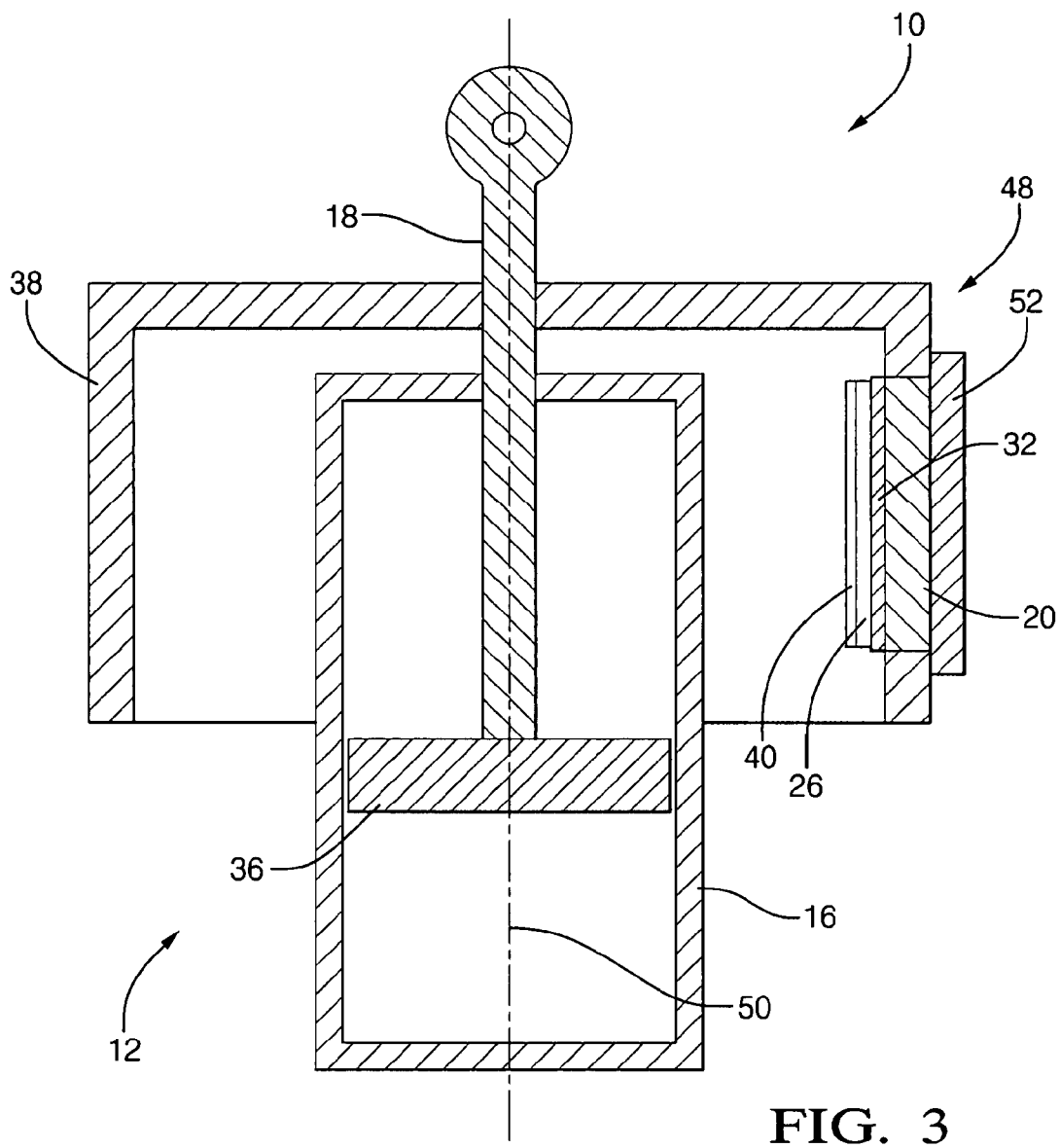
FIG. 3 is a view, as in FIG. 2, but with the piston rod shown at minimum axial extension with respect to the damper body.

Referring now to the drawings, wherein like numerals represent like elements throughout, FIGS. 1-3 show an embodiment of the present invention. A first expression of the embodiment of FIGS. 1-3 is for a piston damper assembly 10 including a piston damper 12 and a relative position sensor 14. The piston damper 12 includes a damper body 16 and a piston rod 18. The piston rod 18 is axially movable within the damper body 16. The relative position sensor 14 includes an axially-extending magnetic core 20, an excitation coil 22, and a position-sensing coil 24. The axially-extending magnetic core 20 is movable with the piston rod 18, is located outside the damper body 16, and has first and second protrusions 26 and 28 extending toward the damper body 16. The excitation coil 22 is wound around the first protrusion 26, and the position-sensing coil 24 is wound around the second protrusion 28.

Describing the piston rod 18 as being axially movable within the damper body 16 means that the piston rod 18 is relatively axially movable within the damper body 16 because the piston rod 18 is axially movable relative to the damper body 16 and/or because the damper body 16 is axially movable relative to the piston rod 18. In one arrangement, an arm (not shown) is directly or indirectly attached to the piston rod 18, and the magnetic core 20 is directly or indirectly attached to the arm.

The relative position sensor 14 is used to measure the position of the piston rod 18 relative to the damper body 16 and/or the position of the damper body 16 relative to the piston rod 18, as can be appreciated by those skilled in the art. In one example, a high frequency sinusoidal excitation current is supplied by an electronics circuit and fed to the excitation coil 22. As verified by experiment, the voltage induced thereby in the position-sensing coil 24 (wherein the voltage has been rectified and filtered to obtain a DC signal) is proportional to the relative axial movement of the piston rod 18 within the damper body 16. In one automotive vehicle application involving the piston damper assembly 10 employed in a controllable shock absorber and/or strut, the relative position measured using the relative position sensor 14 is used for vehicle leveling, headlight aiming, and/or vehicle stability control.

In one implementation of the first expression of the embodiment of FIGS. 1-3, the piston rod 18 has a maximum axial extension (as shown in FIG. 2) with respect to the damper body 16, and the magnetic core 20 axially overlaps the damper body 16 when the piston rod 18 is at the maximum axial extension. In one variation, the piston rod 18 has a minimum axial extension (as shown in FIG. 3) with respect to the damper body 16, and the magnetic core 20 axially overlaps the damper body 16 when the piston rod 18 is at the minimum axial extension.

In one extension of the first expression of the embodiment of FIGS. 1-3, the piston damper assembly 10 also includes a relative velocity sensor 30 having an axially-extending permanent magnet 32 and a velocity-sensing coil 34. The axially-extending permanent magnet 32 is attached to the magnetic core 20 and is disposed between, and spaced apart from, the first and second protrusions 26 and 28. The velocity-sensing coil 34 is wound around the permanent magnet 32.

The relative velocity sensor 30 is used to measure the velocity of the piston rod 18 relative to the damper body 16 and/or the velocity of the damper body 16 relative to the piston rod 18, as can be appreciated by those skilled in the art. In one example, the damper body 16 moving relative to the piston rod 18 acts as a magnetic flux return path. As verified by experiment, the voltage induced in the velocity-sensing coil 34 due to the damper body 16 moving relative to the piston rod 18 is proportional to the velocity of the damper body 16 relative to the piston rod 18 (which is equivalent to the velocity of the piston rod 18 relative to the damper body 16). In one automotive vehicle application involving the piston damper assembly 10 employed in a controllable shock absorber and/or strut, the relative velocity measured using the relative velocity sensor 30 is used for controlling the damping force of the piston damper. Such relative velocity sensors are described in US Patent Application Publication 2005/0120795.

In one implementation of the extended first expression of the embodiment of FIGS. 1-3, the piston rod 18 has a maximum axial extension (as shown in FIG. 2) with respect to the damper body 16, and the magnetic core 20 and the permanent magnet 32 axially overlap the damper body 16 when the piston rod 18 is at the maximum axial extension. In one variation, the piston rod 18 has a minimum axial extension (as shown in FIG. 3) with respect to the damper body 16, and the magnetic core 20 and the permanent magnet 32 axially overlap the damper body 16 when the piston rod 18 is at the minimum axial extension.

In one enablement of the first expression of the embodiment of FIGS. 1-3, the piston damper 12 is a controllable piston damper, and in one example, is chosen from the group consisting of a magnetorheological (MR) damper, an electrorheological damper, and a controllable-valve damper. The piston damper 12 (as shown in FIGS. 1-3) is an example of an MR damper and includes an MR piston 36 attached to the piston rod 18, wherein the MR coil and other well-known MR-damper components have been omitted from the figures for clarity.

A second expression of the embodiment of FIGS. 1-3 is for a piston damper assembly 10 including a piston damper 12 and a relative position sensor 14. The piston damper 12 includes a damper body 16, a piston rod 18, and a dust tube 38 (also called a protective collar). The piston rod 18 is axially movable within the damper body 16. The dust tube 38 circumferentially surrounds at least an axial portion of the damper body 16 and is attached to the piston rod 18. The relative position sensor 14 includes an axially-extending magnetic core 20, an excitation coil 22, and a position-sensing coil 24. The axially-extending magnetic core 20 is attached to the dust tube 38 and has first and second protrusions 26 and 28 extending toward the damper body 16. The excitation coil 22 is wound around the first protrusion 26, and the position-sensing coil 24 is wound around the second protrusion 28. It is noted that the term "attached" includes directly attached and/or indirectly attached.

The implementations, extensions, enablements, etc. of the first expression of the embodiment of FIGS. 1-3 are equally applicable to the second expression of the embodiment of FIGS. 1-3.

In one arrangement of the second expression of the embodiment of FIGS. 1-3, the first and second protrusions 26 and 28 each have a free end 40 substantially aligned with the damper body 16 as shown in FIG. 1.

A third expression of the embodiment of FIGS. 1-3 is for a piston-damper dust tube subassembly 48 including an axially-extending piston-damper dust tube 38 and a relative position sensor 14. The relative position sensor 14 includes an axially-extending magnetic core 20, an excitation coil 22, and a position-sensing coil 24. The axially-extending magnetic core 20 is attached to the dust tube 38 and has first and second protrusions 26 and 28. The excitation coil 22 is wound around the first protrusion 26. The position-sensing coil 24 is wound around the second protrusion 28.

In one arrangement, the damper body 16, the piston rod 18, and the dust tube 38 have a common, axially-extending longitudinal axis 50. In one variation, the magnetic core 20 is indirectly attached to the dust tube 38 using a plate 52 and machine screws 54 as shown in FIG. 1. In another variation, not shown, the magnetic core is directly attached to the inner surface of the dust tube.

Figure 4:
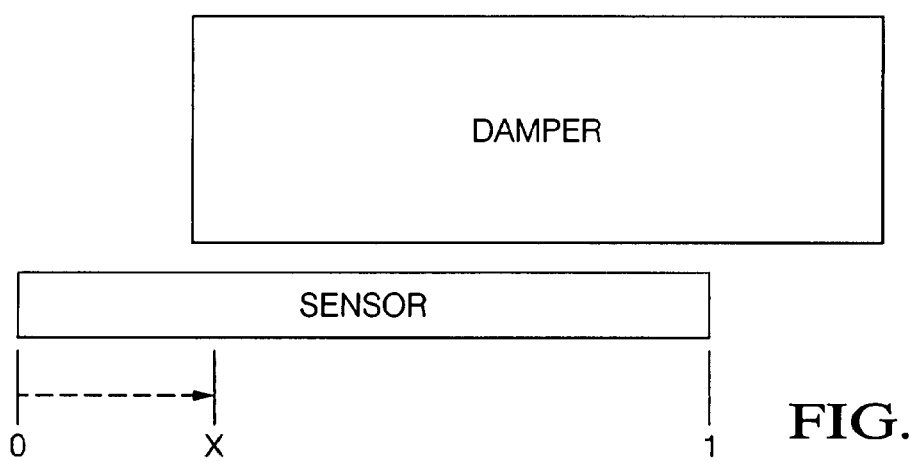
FIG. 4 is a diagram useful in one mathematical explanation of position sensing.

According to one mathematical explanation of the operation of one example of the first, second, and/or third expression of the embodiment of FIGS. 1-3, position sensing can be explained by means of the simplified cross section of the damper and sensor assembly shown in FIG. 4. The primary coil (i.e., the excitation coil 22) is fed with a high frequency sinusoidal current source with peak current, $I_m$ to generate a constant amplitude magnetomotive force, F for a given primary coil turns, $N_p$ $$F = N_p I_m \sin \omega t$$

The flux generated by the magnetomotive force F generates flux $\phi_s$ that flows into the damper outer shell through the air gap at the first air gap protrude and then into the back iron of the sensor through the air gap at the second air gap protrude where the position sensing coil is wound, that links the secondary winding (i.e., the position-sensing coil 24), and that is given by $$\phi_s = [1 - x(t)] \phi_m \sin \omega t$$

where, $\phi_m$ is the peak value of the flux under those conditions when the damper (i.e., the damper body 16) fully overlaps the sensor (x=0). Here, the sensor is the relative position sensor 14.

The flux linkage of the secondary coil is maximum when the damper fully overlaps the sensor and the induced voltage in the secondary coil is maximum for a given number of turns. As the damper moves away from the sensor, the reluctance changes and the flux linking the secondary coil changes and thus the induced voltage varies with damper travel.

The flux linkage, $\lambda_s$ of the secondary coil of $N_s$ turns is given by $$\lambda_s = N_s[1-x(t)]\phi_m \sin \omega t$$

Therefore, the output voltage of the secondary coil is given by $$V_{out} = N_s\phi_m[\omega \cos \omega t - (dx/dt)\sin \omega t - x(t)\omega \cos \omega t] + V_0$$

where:
x=per unit damper travel away from the sensor,
$V_0$=Induced voltage in the secondary coil when the damper is out of the sensor, and
dx/dt=relative velocity.

The excitation frequency is selected such that the velocity induced voltage is neglected. Therefore, the induced output voltage in the secondary coil is given as $$V_{out} = [1-x(t)]N_s\phi_m\omega \cos \omega t + V_0$$

The voltage, $V_0$ is compensated with a bias voltage at the output amplification stage. By selecting a high excitation frequency, the low frequency induced voltage due to relative velocity is neglected. The output voltage is rectified and filtered to obtain a dc signal proportional to the distance traveled by the damper.

In one illustration, there is a 2 mm clearance between the moving damper body 16 and the free end 40 of the first and second protrusions 26 and 28 of the magnetic core 20. In one example, a maximum output voltage sensitivity of 0.108 V/m/s is obtained using a 200 turns coil with a Neodymium Iron Boron bonded magnet having a remanence flux density of 0.43 Tesla and a coercively of 3675 Oe. For a particular microcontroller, it is desired that the output of the relative velocity sensor be 4.5 V at a damper velocity of 2 m/s and 2.5V at 0 m/s and 0.5 V at −2 m/s. The design of a circuit to meet such specifications is within the ordinary level of skill of the artisan.

Several benefits and advantages are derived from one or more of the expressions of an embodiment of the invention. In one example, having a relative position sensor including an axially-extending magnetic core attached to the dust tube, an excitation coil wound around a first protrusion of the magnetic core, and a position-sensing coil wound around a second protrusion of the magnetic core, also allows a relative velocity sensor to be compactly integrated therein. In this example, the relative velocity sensor includes an axially-extending permanent magnet attached to the magnetic core and positioned between, and spaced apart from, the first and second protrusions. In this example, the relative velocity sensor also includes a velocity-sensing coil wound around the permanent magnet.

The foregoing description of several expressions of an embodiment of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A piston damper assembly comprising:
a) a piston damper including:
(1) a damper body; and
(2) a piston rod which is axially movable within the damper body;
b) a relative position sensor including:
(1) an axially-extending magnetic core which is movable with the piston rod, which is disposed outside the damper body, and which has first and second protrusions extending toward the damper body;
(2) an excitation coil wound around the first protrusion; and
(3) a position-sensing coil wound around the second protrusion; and
c) a relative velocity sensor including:
(1) an axially-extending permanent magnet attached to the magnetic core and disposed between, and spaced apart from, the first and second protrusions; and
(2) a velocity-sensing coil wound around the permanent magnet.

2. The piston damper assembly of claim 1, wherein the piston damper is a controllable piston damper.

3. The piston damper assembly of claim 2, wherein the controllable piston damper is chosen from the group consisting of a magnetorheological damper, an electrorheological damper, and a controllable-valve damper.

4. The piston damper assembly of claim 1, wherein the piston rod has a maximum axial extension with respect to the damper body, and wherein the magnetic core axially overlaps the damper body when the piston rod is at the maximum axial extension.

5. The piston damper assembly of claim 4, wherein the piston rod has a minimum axial extension with respect to the damper body, and wherein the magnetic core axially overlaps the damper body when the piston rod is at the minimum axial extension.

6. The piston damper assembly of claim 1, wherein the piston rod has a maximum axial extension with respect to the damper body, and wherein the magnetic core and the permanent magnet axially overlap the damper body when the piston rod is at the maximum axial extension.

7. The piston damper assembly of claim 6, wherein the piston rod has a minimum axial extension with respect to the damper body, and wherein the magnetic core and the permanent magnet axially overlap the damper body when the piston rod is at the minimum axial extension.

8. A piston damper assembly comprising:
a) a piston damper including:
(1) a damper body;
(2) a piston rod which is axially movable within the damper body; and
(3) a dust tube which circumferentially surrounds at least an axial portion of the damper body and which is attached to the piston rod;
b) a relative position sensor including:
(1) an axially-extending magnetic core attached to the dust tube and having first and second protrusions extending toward the damper body;
(2) an excitation coil wound around the first protrusion; and
(3) a position-sensing coil wound around the second protrusion; and
c) a relative velocity sensor including:
(1) an axially-extending permanent magnet attached to the magnetic core and disposed between, and spaced apart from, the first and second protrusions; and
(2) a velocity-sensing coil wound around the permanent magnet.

9. The piston damper assembly of claim 8, wherein the piston damper is a controllable piston damper.

10. The piston damper assembly of claim 9, wherein the controllable piston damper is chosen from the group consisting of a magnetorheological damper, an electrorheological damper, and a controllable-valve damper.

11. The piston damper assembly of claim 8, wherein the piston rod has a maximum axial extension with respect to the damper body, and wherein the magnetic core axially overlaps the damper body when the piston rod is at the maximum axial extension.

12. The piston damper assembly of claim 11, wherein the piston rod has a minimum axial extension with respect to the damper body, and wherein the magnetic core axially overlaps the damper body when the piston rod is at the minimum axial extension.

13. The piston damper assembly of claim 8, wherein the piston rod has a maximum axial extension with respect to the damper body, and wherein the magnetic core and the permanent magnet axially overlap the damper body when the piston rod is at the maximum axial extension.

14. The piston damper assembly of claim 13, wherein the piston rod has a minimum axial extension with respect to the damper body, and wherein the magnetic core and the permanent magnet axially overlap the damper body when the piston rod is at the minimum axial extension.

15. The piston damper assembly of claim 8, wherein the first and second protrusions each have a free end substantially aligned with the damper body.

* * * * *